Figure 1:
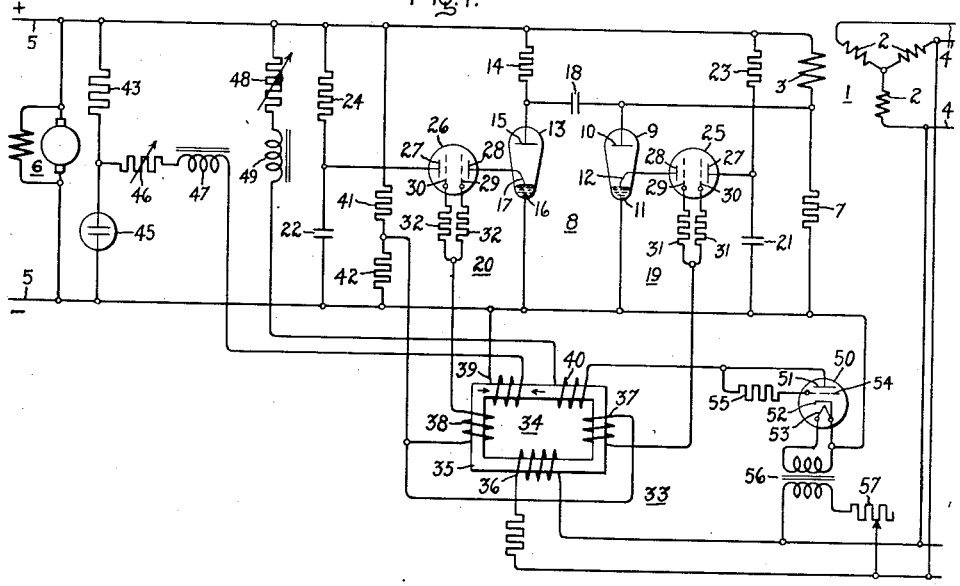

Oct. 21, 1941.　　　E. A. EDWARDS　　　2,260,012

ELECTRIC VALVE CIRCUIT

Original Filed June 22, 1938

Inventor:
Evan A. Edwards,
by Harry E. Dunham
His Attorney.

Patented Oct. 21, 1941

2,260,012

UNITED STATES PATENT OFFICE 2,260,012

ELECTRIC VALVE CIRCUIT

Evan A. Edwards, East Cleveland, Ohio, assignor to General Electric Company, a corporation of New York Original application June 22, 1938, Serial No. 215,166. Divided and this application March 1, 1939, Serial No. 259,143

6 Claims. (Cl. 172—238)

My invention relates to electric valve circuits and more particularly to electric valve circuits for controlling dynamo-electric machines.

This application is a division of my copending application Serial No. 215,166, filed June 22, 1938, which matured into United States Letters Patent No. 2,220,755 on November 5, 1940, and which is assigned to the assignee of the present application.

In the control of dynamo-electric machines, as for example, in excitation circuits for direct current and alternating current generators, it is frequently desirable to energize the field windings from sources of direct current. Furthermore, due to the rapidity of response and the flexibility of control of electric valve apparatus, it is desirable to effect control of the energization of the field windings by employing electric valves. One of the types of excitation circuits which has been found desirable is that regulating system which operates on the Tirrill principle and which employs electronic discharge devices or electric valves for controlling the energization of the circuit. Some of these circuits operate on the principle of alternate opening and closing of the electric valves for a variable number of successive cycles in a manner similar to the time-opened, time-closed effect of the vibratory contacts of a Tirrill type regulator. A system of the latter type is disclosed and claimed in United States Letters Patent No. 2,025,583 granted December 24, 1935, upon an application filed by Alan S. Fitzgerald and George W. Garman, and which is assigned to the assignee of the present application. When it is desired to apply this principle of the Tirrill type regulator to arrangements wherein the field circuit is energized from a source of direct current, it has been found necessary to devise improved control circuits in order to obtain the desired precision of control and regulation.

It is an object of my invention to provide new and improved control circuits for electric valve apparatus.

It is another object of my invention to provide new and improved electric valve translating circuits.

It is a further object of my invention to provide new and improved electric valve excitation circuits for dynamo-electric machines.

It is a still further object of my invention to provide a new and improved excitation circuit for electric valve apparatus and which comprises a saturable inductive device and an associated control circuit for controlling the phase displacement between the control voltages provided by the inductive device.

In accordance with the illustrated embodiment of my invention, I provide an improved control circuit for devices, such as saturable inductive reactances or peaking transformers, which produce periodic voltages of peaked wave form for controlling electric valve apparatus. A saturable inductive device produces alternating voltages of peak wave form adjustable in phase with respect to each other, and an auxiliary circuit controls the magnetization of the core structure to limit the minimum phase displacement between the voltages in order to prevent excessive voltage rises of a dynamo-electric machine which is being controlled by the electric valve apparatus.

Figure 2:
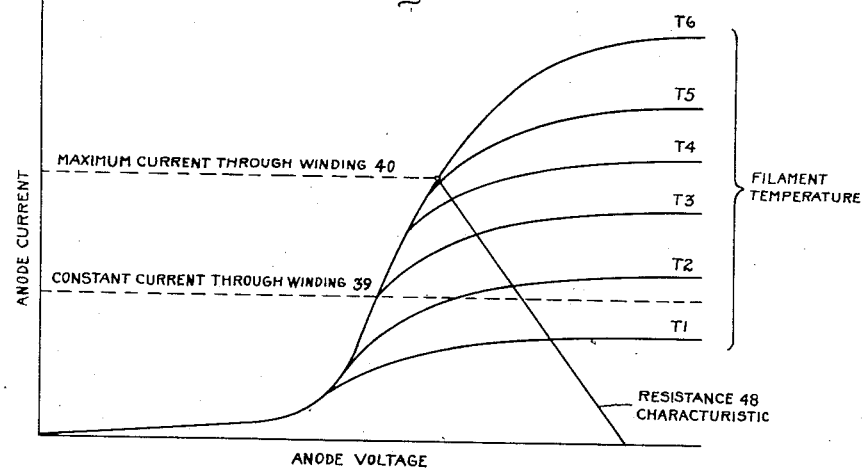

For a better understanding of my invention, reference may be had to the following description taken in connection with the accompanying drawing, and its scope will be pointed out in the appended claims. Fig. 1 is a diagrammatic representation of the embodiment of my invention as applied to the control of the excitation of a field winding of an alternating current generator, and Fig. 2 represents certain operating characteristics of the saturable inductive device shown in Fig. 1.

Fig. 1 diagrammatically illustrates a simplified embodiment of my invention as applied to a regulating or controlling circuit for a dynamo-electric machine 1 which may be of the alternating current or of the direct current type. For the purpose of illustration, machine 1 is shown as being of the alternating current type having armature windings 2 and a field winding 3. The armature windings 2 may be connected to an alternating current circuit 4. A source of direct current 5 energizes the field winding 3. Circuit 5 may be energized from any suitable source, such as a self-excited direct current generator 6. A resistance 7 is connected in series relation with the field winding 3 and an electronic voltage regulator 8 is connected in shunt with the resistance 7. The voltage regulator 8 controls the energization of field winding 3 by periodically short circuiting the resistance 7. The energization of field winding 3 is controlled by controlling the ratio of the period of conduction to the period of nonconduction of electric valve apparatus which shunts the resistance 7.

An electric valve means 9 is connected across the terminals of resistance 7 and controls the average value of the current transmitted to the field winding 3 by periodically short circuiting the resistance 7. The electric valve means 9 is preferably of the type employing an ionizable medium, such as a gas or a vapor, and comprises an anode 10, a cathode 11 and may include a control member 12 of the make-alive or immersion-ignitor type. The immersion-ignitor control member 12 is preferably of a material such as boron-carbide or silicon-carbide and establishes an arc discharge between the anode 10 and the cathode 11 when a sufficiently large current is transmitted to the control member. As a means for rendering the electric valve 9 nonconductive, or, in other words, to effect commutation of current from the electric valve means 9, I provide a second electric valve means 13 which is connected to the direct current circuit 5 through an impedance element, such as a resistance 14. The electric valve means 13 is also preferably of the type employing an ionizable medium and includes an anode 15, a cathode 16 and an immersion-ignitor control member 17. A capacitance 18 is connected between the electric valves 9 and 13 and serves to impress transient negative voltages on the anodes 10 and 15 of electric valves 9 and 13, respectively, to effect commutation of the current between these electric valves.

To energize the control members 12 and 17 of electric valves 9 and 13, respectively, and hence to render the electric valve means 9 and 13 conductive, I provide control circuits 19 and 20 which are associated with electric valves 9 and 13, respectively. Control circuits 19 and 20 include capacitances 21 and 22 which are charged from the direct current circuit 5 through resistances 23 and 24, and also include control electronic discharge devices 25 and 26 which effect energization of the control members 12 and 17 by discharging the capacitances 21 and 22. The electronic discharge devices 25 and 26 are preferably of the type called Strobotrons. These electronic discharge devices are of the type employing an ionizable medium and each includes an anode 27, a cathode 28, an inner grid 29 and an outer grid 30. Either of the grids, or both, may be varied in potential with respect to the potential of the cathode to initiate a discharge. Such conduction is initiated when the difference of potential between any two elements exceeds values characteristic of the device. Current limiting resistances 31 and 32 may be associated with the grids of electronic discharge devices 25 and 26, respectively. While the electronic discharge devices 25 and 26 are represented as being Strobotrons, it is to be understood that I may, if it is so desired, employ electric valves of the thyratron type. That is, I may employ electric valves using an ionizable medium such as a gas or a vapor and having a filamentary cathode or a mercury pool cathode and a control grid for initiating the establishment of an arc discharge.

I provide a control circuit 33 which operates in accordance with a predetermined controlling influence, such as the voltage of the machine 1, or in accordance with the voltage of circuit 4, to effect control of the energization of the field winding 3. The control circuit 33 serves to control the electronic discharge devices 25 and 26 by impressing on the grids thereof periodic voltages adjustable in phase with respect to each other to control thereby the ratio of the period of conduction to the period of non-conduction of the electric valve 9.

A saturable inductive device 34 is connected in the control circuit 33 and is provided with a magnetically saturable core member 35, a primary winding 36, secondary windings 37 and 38 in which there are induced periodic voltages of peaked wave form, and control windings 39 and 40. A voltage divider comprising serially connected resistances 41 and 42 is energized from the direct current circuit 5, providing a point of intermediate potential for the common connection of secondary windings 37 and 38.

Control winding 39 is energized by a substantially constant unidirectional current from a voltage divider comprising a serially connected resistance 43 and a constant voltage device, such as a glow discharge valve 45, which are energized from the direct current circuit 5. A variable resistance 46 and an inductance 47 are connected in series relation with the control winding 39. The magnetomotive forces produced by control windings 39 and 40 are in opposition. Control winding 40 is variably energized to control the phase displacement between the peaks of the voltages induced in windings 37 and 38. Windings 37 and 38 may be connected to grids 29 and 30 of electronic discharge devices 25 and 26. An adjustable resistance 48 and an inductance 49 may be connected in series relation with the control winding 40.

In order to energize variably the control winding 40 and to control thereby the resultant unidirectional magnetomotive force impressed on core member 35, I provide an electric valve 50, preferably of the high vacuum type having an anode 51, a cathode 52, a filamentary heating element 53, and which may have a grid 54 connected to the anode through a current limiting resistance 55. The heating element 53 is variably energized in accordance with a predetermined controlling influence, such as the voltage of circuit 4, to control the current transmitted by valve 50 and hence to control the phase displacement between the peaks of the voltages induced in windings 37 and 38. A transformer 56 may be connected to circuit 4 so that the energization of the heating element 53 is varied in accordance with the voltage of circuit 4. A variable impedance, such as an adjustable resistance 57, may be connected in series relation with the primary winding of transformer 56.

The operation of the embodiment of my invention diagrammatically illustrated in Fig. 1 will be explained by considering the system when the dynamo-electric machine 1 is operating as an alternating current generator to energize circuit 4, and when the excitation system is operating to maintain the voltage of circuit 4 at a substantially constant value. Unidirectional current is transmitted to the field winding 3 from circuit 5 and the magnitude of this current is controlled by the operation of the electric valve 9 which periodically shunts the resistance 7. The average value of the current is a function of the ratio of the period of conduction to the period of nonconduction of the electric valve 9. In its operation, the electric valve 9 simulates the action of the vibratory contacts of the Tirrill type regulator. The length of the periods of conduction of the electric valve 9 is determined by the times at which the electric valve 13 is rendered conductive. One of the electric valves 9 or 13 will be rendered conductive, and current is thereby commutated between the electric valves by rendering the nonconductive valve conductive. If it be assumed that the electric valve 9 is conductive, current is transmitted to the field winding 3 through the electric valve 9 at a predetermined time until the electric valve 13 is rendered conductive, the time being determined by the voltage condition of circuit 4. Electric valve 13 is rendered conductive, thereby rendering electric valve 9 non-conductive due to the transient negative potential impressed on the anode 10 by the operation of the capacitance 18. Electric valve 13 then conducts current until the electric valve 9 is again rendered conductive.

The electronic discharge devices 25 and 26 are rendered conductive by the joint action of the control grids 29 and 30. The capacitances 21 and 22 in control circuits 19 and 20 are charged from the direct current circuit 5 and are periodically discharged through the electronic discharge devices 25 and 26 to effect energization of the control members 12 and 17 and to render electric valves 9 and 13 conductive.

Electric valve 9 is rendered conductive at regular intervals and in the arrangement shown electric valve 9 is rendered conductive once during each cycle of voltage of circuit 4. The electric valve 13 is rendered conductive at the same frequency as electric valve 9 but at a variable time relative to the time at which electric valve 9 is rendered conductive. In this manner, the ratio of the period of conduction to the period of nonconduction of the electric valve 9 is controlled and the average current transmitted to the field winding 3 is also controlled.

Control circuit 33 functions to control the phase displacement between the peaks of periodic voltages induced in windings 37 and 38 in accordance with the voltage of circuit 4. Control winding 39 impresses a constant unidirectional magnetomotive force on the core member 35 and control winding 40 impresses an opposing variable unidirectional magnetomotive force on the core member to control the resultant unidirectional flux in the core member. The value of the constant current supplied by the control winding 39 is adjusted to shift the peaks of the voltages induced in the secondary windings to a minimum phase displacement limit for raising the voltage of circuit 4. The current transmitted by the control winding 40, since it opposes the effect of winding 39, tends to increase the phase displacement between the peaks of voltages induced in the secondary windings 37 and 38. Due to the fact that constant current is supplied to the control winding 39 and due to the fact that the electric valve 50 can conduct current in only one direction, there is provided an arrangement for limiting the minimum phase displacement between the peaks of the voltages induced in windings 37 and 38.

Electric valve 50 conducts variable amounts of current in accordance with the voltage of circuit 4 by utilizing the cathode temperature-anode current characteristics of the electric valve. The electric valve 50 is operated within the saturated region so that the amount of current transmitted thereby varies in accordance with the cathode temperature. As the voltage of circuit 4 tends to rise, the electric valve 50 conducts a greater amount of current, effecting an increase in phase displacement between the peaks of the voltages produced by windings 37 and 38. In like manner, a decrease in voltage of circuit 4 will cause electric valve 50 to conduct a smaller amount of current, thereby decreasing the phase displacement between the peaks of the voltages induced in windings 37 and 38.

The curves T1—T6 of Fig. 2 represent the operating characteristics of the electric valve 50 for a variety of different filament temperatures.

It will be noted that the current transmitted by the electric valve 50 is limited to a maximum value established by the filament temperature—anode current characteristics of the valve and the value of the resistance 48 which is connected in series relation with the valve. Therefore, for a fixed value of voltage of circuit 5, the range of shift of the phase displacement between the peaks of the voltages induced in windings 37 and 38 is limited.

While I have shown and described my invention as applied to particular systems of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, a device comprising a magnetically saturable core structure, a primary winding energized from said alternating current circuit, a secondary winding in which there is induced a periodic voltage of peaked wave form and a pair of opposing control windings, means for supplying to one of said control windings a substantially constant unidirectional current, and means for supplying to the other control winding a unidirectional current which varies in response to a predetermined electrical controlling influence comprising an electric valve having a filamentary cathode and means for varying the energization of said cathode in accordance with said influence and for utilizing the cathode temperature-anode current characteristic of said electric valve for controlling the range of phase shift of said periodic voltage relative to the voltage of said alternating current circuit.

2. In combination, an alternating current circuit, a device having a magnetically saturable core structure, a primary winding energized from said alternating current circuit, a secondary winding in which there is induced an alternating voltage of peaked wave form and a pair of opposing control windings, means for supplying a substantially constant unidirectional current to one of said control windings, and means for transmitting a variable unidirectional current to the other control winding to vary the phase displacement between the peaks of said alternating voltage and comprising a unidirectional conducting device connected in series relation with said other control winding and a circuit for controlling the current transmitted by said unidirectional device in accordance with a controlling influence for limiting the maximum phase displacement between said alternating voltage of peaked wave form and the voltage of said alternating current circuit.

3. In combination, an alternating current circuit, a device having a magnetically saturable core structure, a primary winding energized from said alternating current circuit, a secondary winding in which there is induced an alternating voltage of peaked wave form and a pair of opposing control windings, means for supplying a substantially constant unidirectional current to one of said control windings, means for transmitting a variable unidirectional current to the other control winding to vary the phase displacement between the peaks of said alternating voltage and comprising a unidirectional conducting device connected in series relation with said other winding, and means connected in circuit with said control windings for establishing the range of change of the resultant unidirectional flux of said core structure and for limiting the range of phase displacement between said peaks.

4. In combination, an alternating current circuit, a device having a magnetically saturable core structure, a primary winding energized from said alternating current circuit, a secondary winding in which there is induced an alternating voltage of peaked wave form and a pair of opposing control windings, means for supplying a substantially constant unidirectional current to one of said control windings, means for transmitting a variable unidirectional current to the other control winding to vary the phase displacement between the peaks of said alternating voltage and comprising a unidirectional conducting device connected in series relation with said other windings, and means for adjusting the value of said constant current and for limiting the minimum phase displacement between said peaks.

5. In combination, an alternating current circuit, a device having a magnetically saturable core structure, a primary winding energized from said alternating current circuit, a secondary winding in which there is induced an alternating voltage of peaked wave form and a pair of opposing control windings, means for supplying a substantially constant unidirectional current to one of said control windings, means for transmitting a variable unidirectional current to the other control winding and for varying the phase displacement between the peaks of said alternating voltage and comprising an electric valve, means for controlling the current transmitted by said electric valve in accordance with an electrical condition of said alternating current circuit, and means for adjusting the value of said constant current for maintaining a minimum phase displacement between said peaks irrespective of variations in said electrical condition.

6. In combination, an alternating current circuit, a device having a magnetically saturable core structure, a primary winding energized from said alternating current circuit, a secondary winding in which there is induced an alternating voltage of peaked wave form and a pair of opposing control windings, means for supplying a substantially constant unidirectional current to one of said control windings, means for transmitting a variable unidirectional current to the other control winding and for varying the phase displacement between the peaks of said alternating voltage and comprising an electric valve having a filamentary cathode, and means for energizing said cathode in accordance with the voltage of said alternating current circuit, the value of said constant current being such that the minimum phase displacement between the peaks of said voltage is limited.

EVAN A. EDWARDS.